US011995216B2

(12) United States Patent
Cui et al.

(10) Patent No.: US 11,995,216 B2
(45) Date of Patent: *May 28, 2024

(54) INJECTABLE HARDWARE AND SOFTWARE ATTESTATION OF SENSORY INPUT DATA

(71) Applicant: RED BALLOON SECURITY, INC., New York, NY (US)

(72) Inventors: Ang Cui, New York, NY (US); Joseph Dean Pantoga, New York, NY (US)

(73) Assignee: RED BALLOON SECURITY, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/972,035

(22) Filed: Oct. 24, 2022

(65) Prior Publication Data

US 2023/0045734 A1    Feb. 9, 2023

Related U.S. Application Data

(63) Continuation of application No. 17/100,042, filed on Nov. 20, 2020, now Pat. No. 11,481,519, which is a continuation of application No. 15/279,245, filed on Sep. 28, 2016, now Pat. No. 10,872,169.

(60) Provisional application No. 62/256,665, filed on Nov. 17, 2015, provisional application No. 62/233,538, filed on Sep. 28, 2015.

(51) Int. Cl.
*G06F 21/64* (2013.01)
*H04W 24/04* (2009.01)
*H04W 24/06* (2009.01)

(52) U.S. Cl.
CPC ............ *G06F 21/64* (2013.01); *H04W 24/04* (2013.01); *H04W 24/06* (2013.01)

(58) Field of Classification Search
USPC .......................................................... 455/67
See application file for complete search history.

(56) References Cited

U.S. PATENT DOCUMENTS

| 3,621,387 | A | 11/1971 | Smith et al. |
| 6,304,960 | B1 | 10/2001 | Yeh et al. |
| 7,260,371 | B1 | 8/2007 | Yones |
| 9,137,247 | B2 * | 9/2015 | Smith ................. H04L 63/0861 |

(Continued)

FOREIGN PATENT DOCUMENTS

| CA | 2767723 | 1/2011 |
| CA | 2767723 | 8/2018 |
| GB | 2440190 | 1/2008 |

OTHER PUBLICATIONS

International Search Report and Written Opinion dated Jan. 5, 2017 for International Application No. PCT/US2016/054227.

*Primary Examiner* — Sakinah White Taylor
(74) *Attorney, Agent, or Firm* — Sheppard, Mullin, Richter & Hampton LLP (57) ABSTRACT

Methods of sensory input integrity attestation are provided. Artifacts included within devices under test inject a known noise signal into the output signal of one or more output devices that are detectable by one or more input devices (i.e., sensors) of an embedded device, and monitor the received input data. By comparing the received signal against the expected noise signal, attestation of the validity of sensory input data is possible. Such sensory input data attestation is capable either locally or using a remote attestation device with knowledge of the expected data stream.

25 Claims, 7 Drawing Sheets

(56) References Cited

U.S. PATENT DOCUMENTS

| | | |
|---|---|---|
| 9,563,580 B2 | 2/2017 | Warner |
| 2003/0133010 A1 | 7/2003 | Hagiwara |
| 2006/0080556 A1 | 4/2006 | Rhoads |
| 2007/0296476 A1* | 12/2007 | Hessen-Schmidt .......................... G01R 31/31726 327/162 |
| 2008/0031144 A1 | 2/2008 | Kawamoto et al. |
| 2008/0126359 A1 | 5/2008 | Rhoads |
| 2011/0087887 A1 | 4/2011 | Achim et al. |
| 2012/0005466 A1 | 1/2012 | Wagner et al. |
| 2012/0290230 A1 | 11/2012 | Berges Gonzalez et al. |
| 2013/0298242 A1 | 11/2013 | Kumar et al. |
| 2014/0033310 A1 | 1/2014 | Cheng |
| 2014/0104103 A1 | 4/2014 | Enge et al. |
| 2014/0155098 A1 | 6/2014 | Markham et al. |
| 2014/0170983 A1 | 6/2014 | Leveille |
| 2014/0254407 A1 | 9/2014 | Williams |
| 2014/0289833 A1 | 9/2014 | Briceno et al. |
| 2014/0304505 A1 | 10/2014 | Dawson |
| 2015/0149929 A1 | 5/2015 | Shepard et al. |
| 2015/0179182 A1 | 6/2015 | Vinton |
| 2015/0180581 A1 | 6/2015 | Steiner et al. |
| 2015/0188938 A1 | 7/2015 | Freeze-Skret |
| 2015/0242273 A1* | 8/2015 | Resch ................... H04L 63/102 714/763 |
| 2015/0270867 A1 | 9/2015 | Young et al. |
| 2015/0326463 A1 | 11/2015 | Solondz |
| 2016/0066200 A1 | 3/2016 | Dayanandan et al. |
| 2016/0092700 A1* | 3/2016 | Smith .................... G06F 21/64 726/1 |
| 2016/0142097 A1 | 5/2016 | Matic et al. |
| 2016/0294464 A1 | 10/2016 | HomChaudhuri et al. |
| 2017/0032670 A1 | 2/2017 | Poornachandran et al. |
| 2017/0090483 A1* | 3/2017 | Smith .................... H04W 4/44 |
| 2021/0029562 A1* | 1/2021 | Notargiacomo ...... H04W 8/183 |

* cited by examiner

INJECTABLE HARDWARE AND SOFTWARE ATTESTATION OF SENSORY INPUT DATA

CROSS-REFERENCE TO RELATED APPLICATIONS

This application is a continuation of U.S. application Ser. No. 17/100,042 filed on Nov. 20, 2020, which is a continuation of U.S. application Ser. No. 15/279,245 filed on Sep. 28, 2016, which claims the benefit of U.S. Provisional Application No. 62/233,538 filed Sep. 28, 2015, and U.S. Provisional Application No. 62/256,665 filed Nov. 17, 2015, each of which is hereby incorporated herein by reference in their entirety.

TECHNICAL FIELD

The disclosed technology relates generally to security validation of computing devices, and more particularly, some embodiments relate to active integrity attestation of sensor input data.

DESCRIPTION OF THE RELATED ART

An embedded device is a special-purpose object with a dedicated function included within computing systems. The use of embedded devices is pervasive, with embedded devices being incorporated for many diverse purposes. Embedded systems are pervasive throughout both civilian and specialized (e.g., military) infrastructures. Traffic control systems, communication networks, automotive systems, weapons systems, aviation infrastructure, energy grids, medical devices, point of sale ("PoS") systems, access control systems, and the Internet are just a few of the environments where embedded devices are prevalent.

Embedded devices typically have many different sensors included to capture and provide data so that the embedded device is capable of performing its function. The sensory input captured by such sensors is vital, as information captured by these one or more sensors is necessary to the performance of the intended function. For example, video feeds from drones or autonomous systems must be trustworthy as mission decisions may be dependent on the captured data.

Some attestation methods focus on validating the integrity of the overall system through the use of "power fingerprinting." Power fingerprinting relies on determining an identified baseline model of the power consumption expected during operation. The baseline can be compared against power readings during operation to validate that the expected code is executing. However, such a passive method of attestation relies on understanding what the "normal" consumption level should be, increasing the chance of false positives or false negatives.

BRIEF SUMMARY OF EMBODIMENTS

According to various embodiments of the disclosed technology, a method of sensory input integrity attestation is provided, comprising generating a noise signal by an output artifact, the noise signal representing an expected data stream; emitting an aggregate output signal by an output device of a computing device, the aggregate output signal comprising the noise signal and a normal output signal; receiving an aggregate input signal by an input device of a computing device; extracting a received noise signal by the input artifact to identify a received data stream according to a pre-determined encoding scheme; and comparing the received data stream and the expected data stream.

According to various embodiments of the disclosed technology, a method of remote sensory input integrity attestation is provided, comprising: generating a noise signal by an output artifact, the noise signal representing an expected data stream; emitting an aggregate output signal by an output device of a computing device, the aggregate output signal comprising the noise signal and a normal output signal; receiving an aggregate input signal by an input device of the computing device; transmitting the received aggregate input signal to the remote attestation device; extracting a received noise signal form the received aggregate input signal by an input artifact of the remote attestation device to identify a received data stream according to a pre-determined encoding scheme; and comparing the received data stream and the expected data stream.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments of the technology disclosed herein are directed toward devices and methods for providing security validation and/or integrity attestation of sensors. More particularly, the various embodiments of the technology disclosed herein relate to security validation and/or integrity attestation of sensory input data. Injected artifacts (software, hardware, or both) generate a known interference or noise signal on top of the normal emission signals of one or more output devices. In this way, the input of one or more sensors may be validated by comparing the expected emission signal against the received input signal, providing confidence that the one or more sensors have not been compromised.

Figure 1:
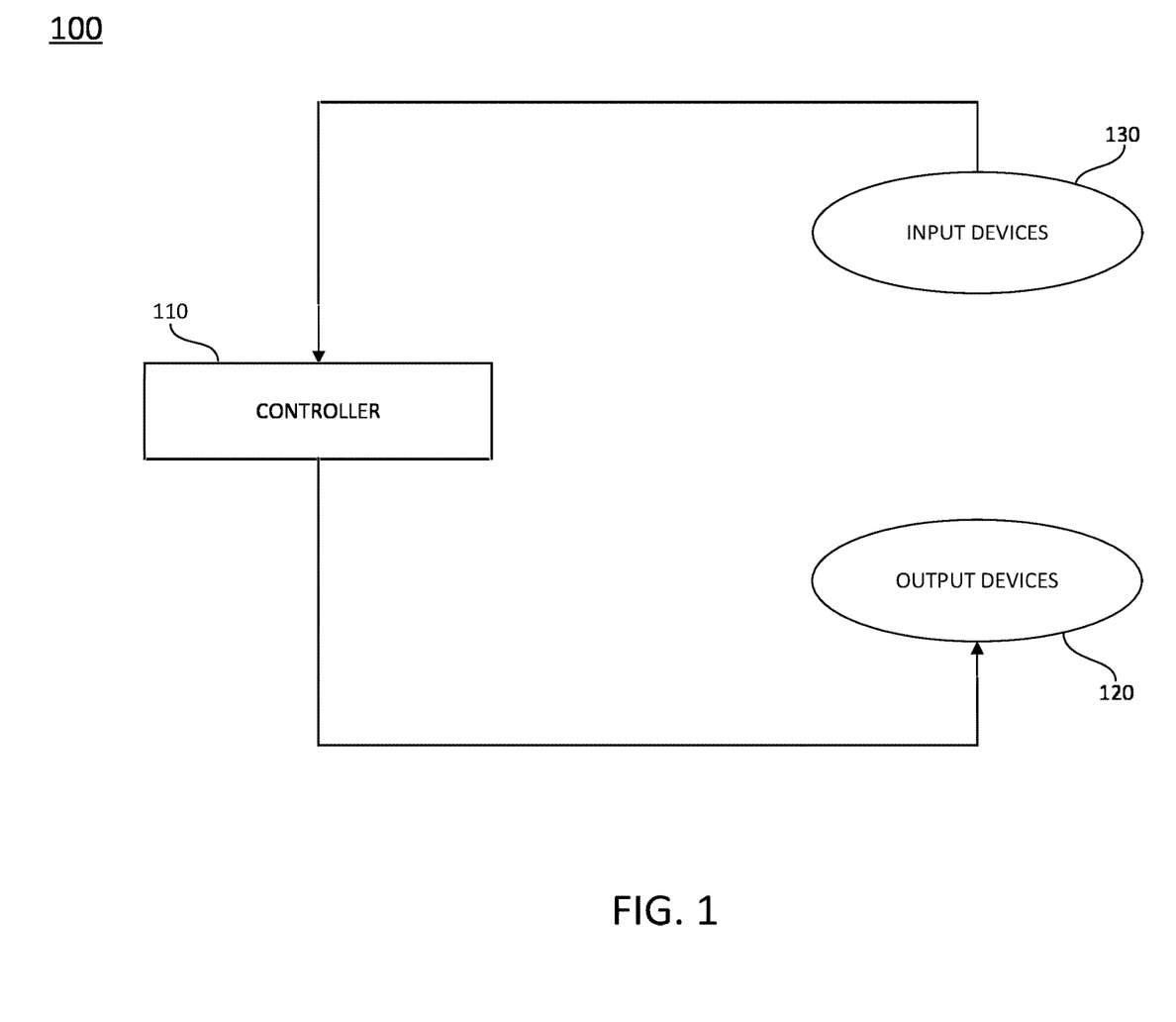
FIG. 1 illustrates an example device in which various embodiments of the technology disclosed herein may be implemented.

FIG. 1 illustrates an example device 100 in which various embodiments of the technology disclosed herein may be implemented. The example device 100 is a generic representation for a variety of devices with which various embodiments of the technology disclosed herein may be implemented. Non-limiting examples of such devices include: robotic equipment; general-purpose computing devices; switches, routers, and other networking equipment; embedded devices; kitchen and home appliances; point of sale ("PoS") and other terminal devices; avionics; medical devices; weapons systems; drones or other autonomous vehicles; automotive control systems; GPS or other positioning systems; and other computing and embedded devices. As illustrated, a controller 110 is communicatively coupled to an output device 120 and an input device 130. The controller 110 may be a processor and associated software configured to control operation of the output device 120 and input device 130. In various embodiments, one or more output devices 120 and/or one or more input devices 130 may be included within the example device 100.

Although only a single controller 110 is illustrated, a person of ordinary skill in the art would understand that the illustrated embodiment is a simplified, generic representation of an example device 100. More than one controller may be present within the output and input paths. Nothing in this disclosure should be interpreted to limit the scope of the claims to devices with a single controller.

Within the device 100, an output device 120 is any device, component, or element within the device 100 communicatively connected to the controller 110 that can be controlled to emit a signal. Any device, component, or element within an embedded system that is capable of producing an output signal in any transmission medium can act as an output device 120. Non-limiting examples of components that may serve as output device 120 may include one of: speakers; monitors or screens; LEDs or other light sources; fans; motors; actuators; mechanical peripheral devices present within embedded systems; capacitors; wires or cables; connectors or ports; or other passive electrical or internal computer components within embedded systems. The output device 120 may be any component that may be manipulated to emit an output signal.

Within the environment 100, an input device 130 is any device, component, or element within the environment 100 communicatively connected to the controller 110 that can receive or capture a signal within the environment. Any device, component, or element within an embedded system that is capable of detecting signals in any transmission medium can act as an input device 130. Non-limiting examples of input device 130 may include one of: image sensors; microphones; heat sensors; antennas; electromagnetic sensors; moisture sensors; vibration sensors; or other devices configured to detect signals of any frequency over all transmission mediums, ranging from sub-acoustic to the entirety of the EM spectrum.

Although discussed above as separate elements, it is possible for a type of component to act as an output device at some times, and an input device at others. For example, a microphone can act as an input device 130 when it is capturing acoustic or audio signals emanating within the environment 100. At other times, the controller 100 could control the microphone to emit acoustic or sub-acoustic signals that can be captured by another sensor. A person of ordinary skill in the art would appreciate that the non-limiting lists of output devices 120 and input devices 130 discussed above do not limit a particular type of device, component, or element to only one personality (either output or input). The list is provided simply for ease of discussion.

By inducing a known pattern of noise into the output signal emitted by an output device, it is possible to actively attest the integrity of sensor input data of an input device. For example, assume that the input device is a video camera operating within a closed-circuit security system. Simply viewing the image feed captured by the video camera does not validate that what the video camera is capturing is the real scene within the field of view of the video camera. If a person wanted to walk through the field of view of the camera without being detected, they could compromise the video camera and have the video camera send to the system a looped image feed of the scene just prior to entering the area. This is a common approach shown in heist or espionage films. However, by injecting an element of uniqueness into the input data being received by the video camera, the ability to falsify the input (e.g., loop a recorded portion of the image feed) is easily detectable, whether in real-time or a later time. The noise signal injected may include a known unique pattern over a period, thereby allowing for active validation that what is being captured by the input device is valid.

Figure 2:
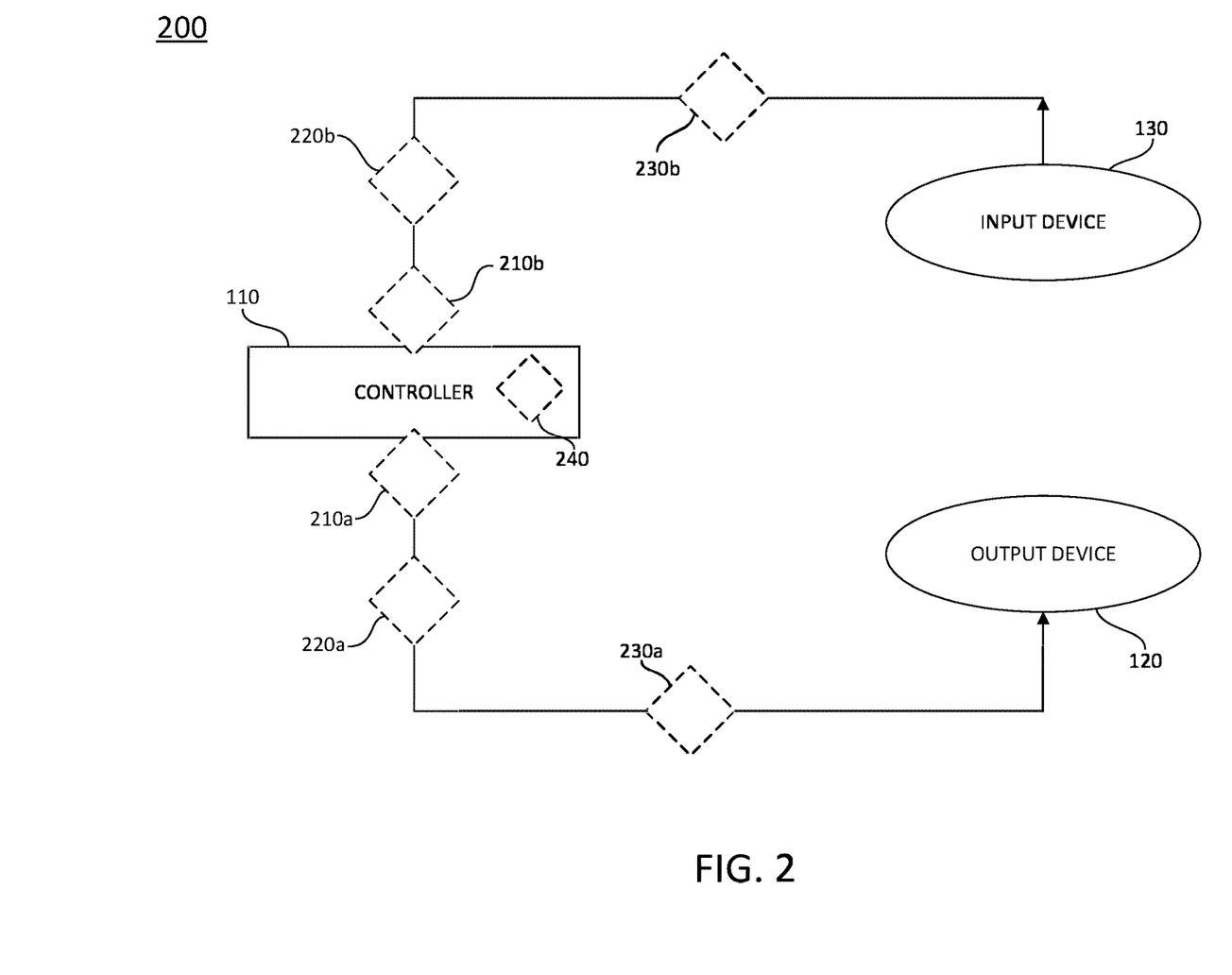
FIG. 2 illustrates an example sensor attestation-capable device in accordance with various embodiments of the technology disclosed herein.

FIG. 2 illustrates an example sensor attestation-capable device 200 in accordance with various embodiments of the technology disclosed herein. The example sensor attestation-capable device 200 is similar to the example device 100 discussed with respect to FIG. 1, sensor attestation-capable device 200 being a generic representation of an example device capable of sensor input integrity attestation of sensor input data. Like-referenced elements of FIGS. 1 and 2 should be interpreted consistently unless otherwise noted. As illustrated in FIG. 2, the sensor attestation-capable device 200 may have artifacts to inject a known data stream into the output signal of one or more output devices 120. An "artifact" is a purposely-introduced component within an embedded system that causes a specific, known variation within the operation of an associated output device. In various embodiments, the artifact may be a software artifact (210a, 210b), hardware artifact (220a, 220b), or a combination software/hardware artifact (230a, 230b). Artifacts (210a, 210b), (220a, 220b), (230a, 230b) may comprise software and/or hardware modifications within the controller 110, the output device 120, the input device 130, or a combination thereof in various embodiments. Although shown as pairs, in some embodiments a mix of different types of artifacts may be implemented. For example, some embodiments have include a hardware output artifact 230a and a software input artifact 210b.

In various embodiments, an implant 240 may be included in the controller 110. The implant 240 may be responsible for monitoring some observable critical condition within the device, such as all hardware and software based attestation mechanisms, as well as arbitrary algorithms computed on data captured or extracted from the device during its operation. In some embodiments, implant 240 sets the expected data stream, which is used by the output artifacts 210a, 220a, or 230a to generate the noise signal and by the input artifacts 210b, 220b, or 230b to determine if there is a match with the received data stream.

In various embodiments, the artifacts 210a, 220a, 230a, 210b, 220b, 230b, and/or implant 240 may be installed in the sensor attestation-capable device 200 after production to enable sensory input data attestation of legacy devices. In other embodiments, the artifacts 210a, 220a, 230a, 210b, 220b, 230b, and/or implant 240 may be built into the sensor attestation-capable device 200 during manufacturing, enabling sensory input data attestation as a built-in function of the device.

The output artifacts 210a, 220a, or 230a operate the output device 120 as dictated by the controller 110, and adds a small variation (i.e., noise signal) on top of the original signal of the controller 110. That is, the output artifacts 210a, 220a, or 230a inject the noise signal enabling attestation of sensory input data. As discussed above, the noise signal generated by the output artifact 210a, 220a, or 230a is generated according to an expected data stream. In other words, the output artifacts 210a, 220a, or 230a will cause the output device 120 to operate according to the aggregate of the original signal of the controller 110 and the variation (i.e., noise signal) introduced by the artifact. The altered state will change the emanation profile (i.e., the emitted output signal) of the output device 120. The output artifacts 210a, 220a, or 230a may use a pre-determined modulation and encoding scheme to encode the noise signal. For example, the output artifact 210a, 220a, or 230a may encode the expected data stream as a binary data stream. In some embodiments, cryptographic protection may be used to further protect the transmitted data. In various embodiments, the implant 240 may perform the functions of the output artifacts 210a, 220a, or 230a (i.e., injecting the noise signal).

The input artifacts 210b, 220b, or 230b control the way the input device 130 are operated and extracts the received emanations from the output device 120. The input artifacts 210b, 220b, or 230b may behave as a monitor, analyzing the received aggregate sensory input data to determine if it is valid. In various embodiments, the input artifacts 210b, 220b, or 230b may extract the raw data received by the input device 130 into two data components: one extracted data component representing the normal output signal of the output device 120, and a second data component representing the noise signal injected by the output artifact 210a, 220a, or 230b. In various embodiments, the extracting or discrimination of the induced signal (i.e., noise signal) and the unmodified signal (i.e., normal output signal of the output device 120) may be accomplished using well-known signal processing techniques, and/or additional signal processing hardware. The pre-determined modulation and encoding scheme is known to the input artifacts, enabling the noise signal to be decoded into the received data stream for use in comparing the received data stream and the expected data stream. In various embodiments, the comparison may be conducted by the controller 110 or the input artifact 210b, 220b, or 230b. Where cryptographic protection is implemented, the input artifacts 210b, 220b, or 230b may have knowledge of the cryptographic key enabling decryption of the received signal. In various embodiments, implant 240 may perform the functions of the input artifacts 210b, 220b, or 230b (i.e., monitoring the sensory input data).

Figure 3A:
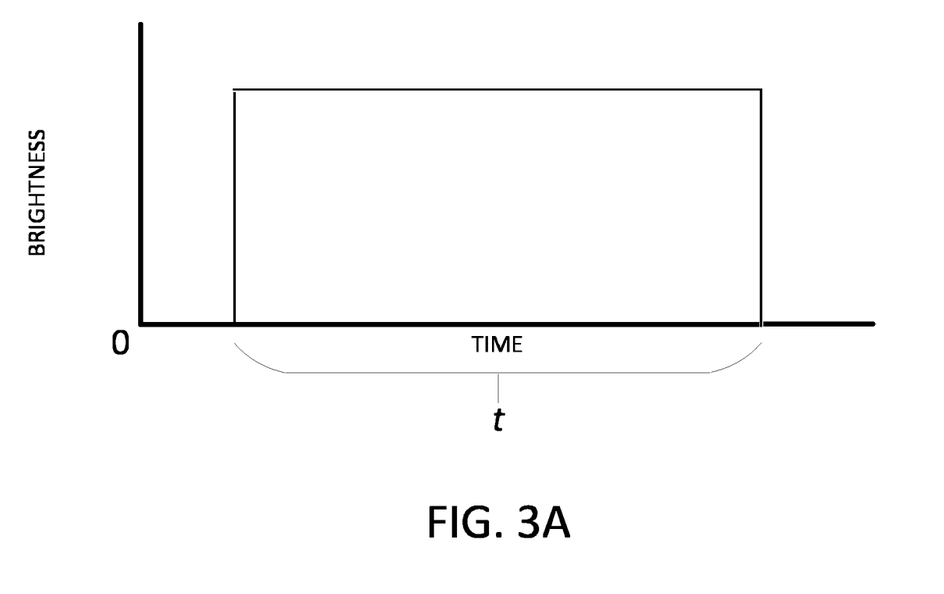
FIG. 3A illustrates the emitted signal (i.e., brightness) of an example output device in an example device in accordance with various embodiments of the technology disclosed herein.

Utilizing the injected artifacts, it is possible to validate the input data received by an input device 130. As an example, assume that the output device 120 is a light source (such as a light bulb) and the input device 130 is an image sensor (e.g., camera). In a device not capable of sensory input attestation (such as example device 100 of FIG. 1), a controller may turn on, then turn off, the light bulb. Over a period t, the brightness of the light bulb remains constant, as illustrated in FIG. 3A. As the brightness of the light bulb should remain constant during the period t, it is difficult to determine whether the image captured by the camera is trustworthy. The only indication would be at the transition period between the bulb being on or off. This makes integrity attestation of the camera during the period t difficult, if not impossible.

Figure 3B:
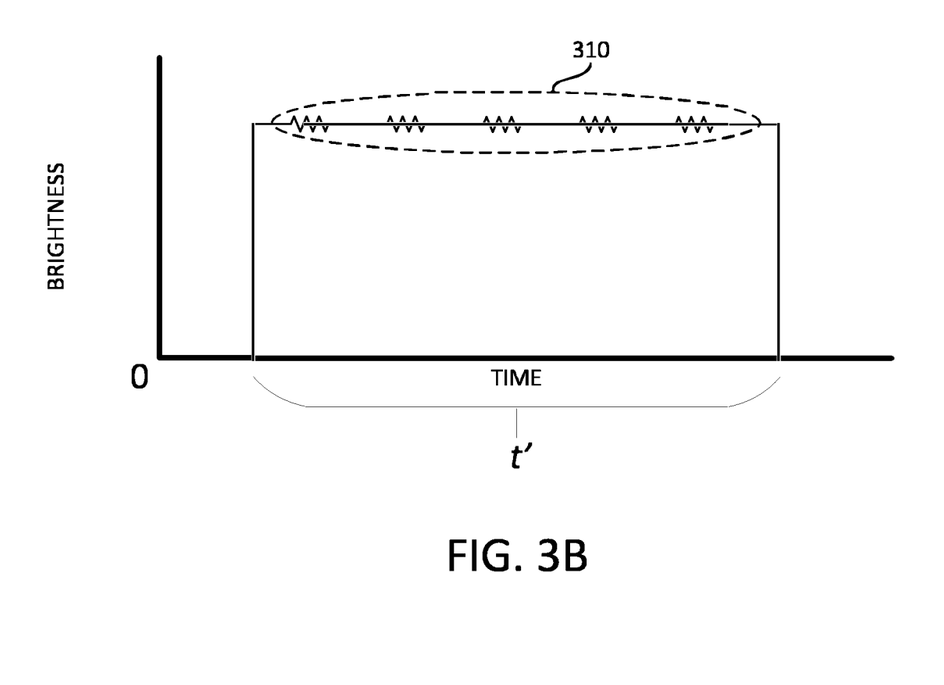
FIG. 3B illustrates the emitted signal (i.e., brightness) of an example output device in an example sensor attestation-capable device in accordance with various embodiments of the technology disclosed herein.

In a sensor attestation-capable device (such as example device 200 of FIG. 2), an injected output artifact 210a, 220a, or 230a may introduce a minute stream of input that causes the brightness of the light bulb to vary slightly over time. FIG. 3B illustrates the brightness (i.e., emitted signal) of the light bulb in the modified environment. As illustrated, the brightness of the light bulb fluctuates 310 over the period t'. The image sensor records the raw brightness data over period t', and an input artifact can extract the induced brightness data stream 310 from the raw brightness data. The input artifact may further demodulate and decode the induced brightness data stream 310 according to the pre-determined modulation and encoding scheme, as discussed above with respect to FIG. 2.

Figure 3C:
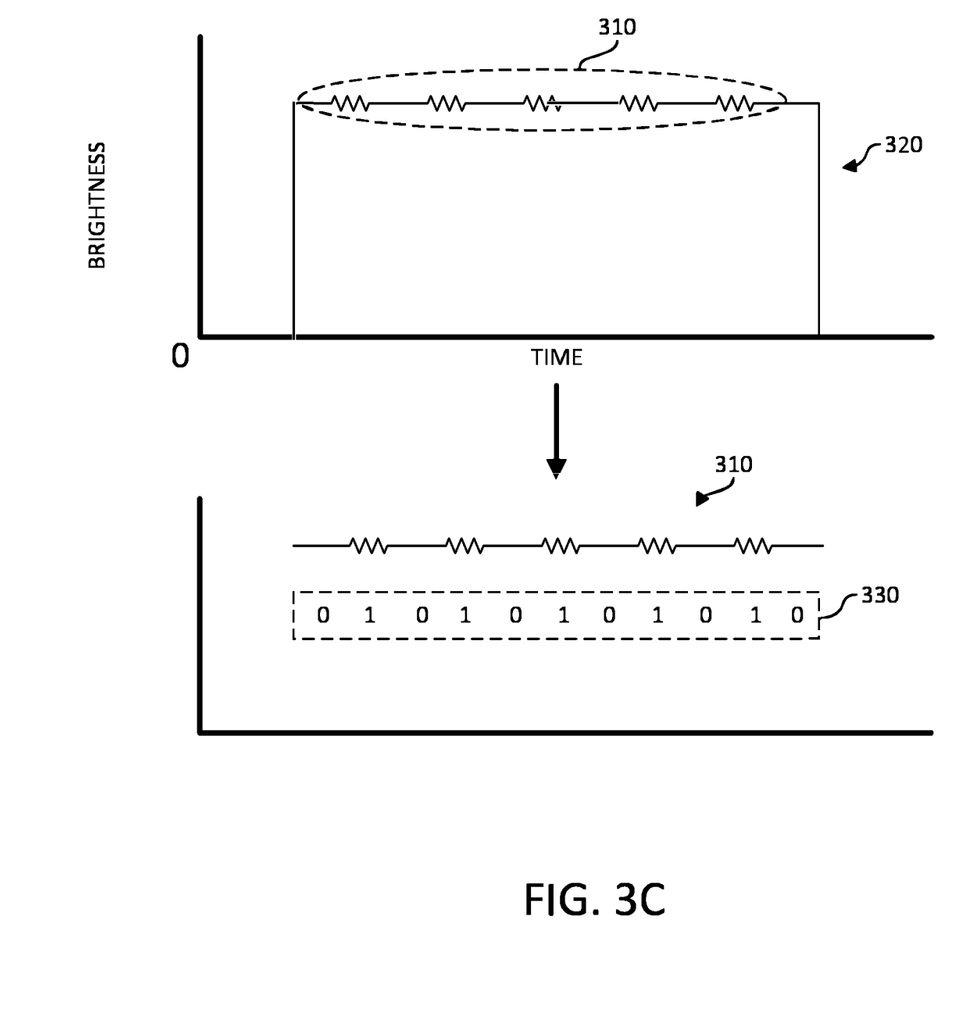
FIG. 3C illustrates an example extracted and decoded received data stream in accordance with various embodiments of the technology disclosed herein.

FIG. 3C illustrates the identification of the expected data stream from the aggregate input signal. As illustrated, the induced brightness data stream 310 can be extracted from the aggregate input signal 330. The input artifact can further decode the induced brightness data stream 310 utilizing the pre-determined encoding scheme used to code the expected data stream. For example, the expected data stream may have been a binary encoding scheme. Accordingly, the induced brightness data stream 310 may result in a received data stream 330, which can be compared against an expected data stream.

After filtering, the received data stream may be checked against the expected data stream to validate the integrity of the signal received by the input device 130. If the two data streams do not match, a mismatch response may be triggered by the controller 110 or the input artifact 210b, 220b, or 230b. A mismatch response can be any alert provided or action taken in response to an identified mismatch of the expected data stream and the received data stream. Non-limiting examples of mismatch responses include but are not limited to: generating and transmitting an alert to a second device; collecting forensic data; performing one or more additional system checks; shutdown of a computing device associated with the input device; or reboot the computing device associated with the input device; or any other type of action. Although example types of mismatch responses are provided, that an action is taken in response to identification of a mismatch is important because simply identifying a mismatch fails to address or remedy to the issue. In some embodiments, the mismatch response may include acknowledgement of the mismatch but taking no action.

In this manner, active attestation checking the integrity of data received by a sensor is possible because a known noise signal is induced in the emission signal of one or more output devices. In many applications, validation of sensor input data is important. For example, video feeds from drones or autonomous systems must be trustworthy as mission decisions may be dependent on the captured data. If the image sensor capturing the scene has been compromised, without having a reference within the received feed, active validation is impossible.

Figure 4:
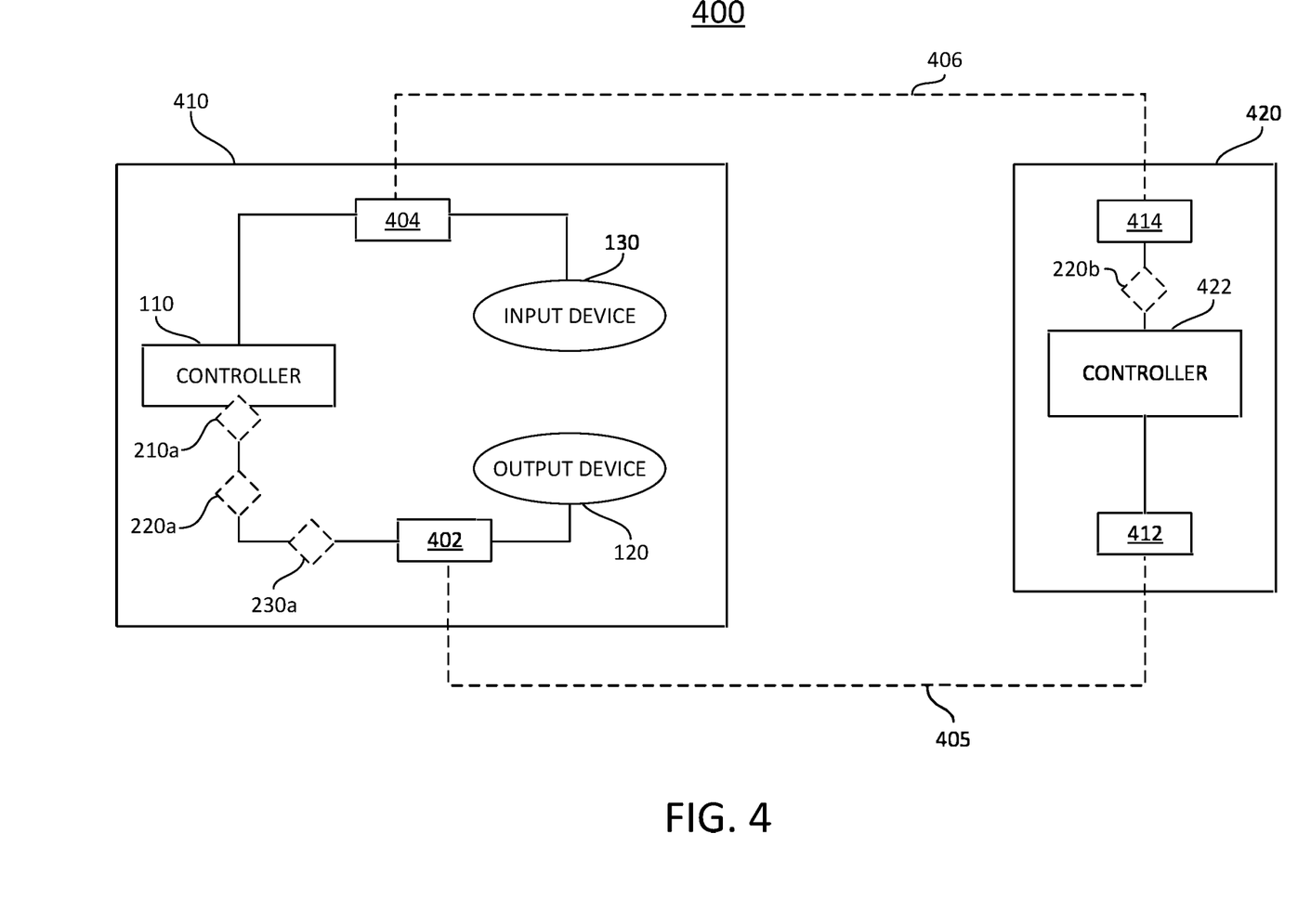
FIG. 4 illustrates an example remote attestation environment in accordance with various embodiments of the technology disclosed herein

Up until now, the technology of the present disclosure has been discussed with respect to local attestation, i.e., attestation occurring local to the computing device. In various embodiments, the active attestation techniques disclosed herein may be performed remotely. FIG. 4 illustrates an example remote attestation environment 400 in accordance with embodiments of the technology disclosed herein. As illustrated, the example remote attestation environment 400 includes an example device environment 410, similar to the example environments 100 and 200 discussed with respect to FIGS. 1 and 2, respectively. Like-referenced elements of FIGS. 1, 2, and 4 should be interpreted consistently unless otherwise noted. In the illustrated embodiment of FIG. 4, the output artifact 210a, 220a, or 230a generate a noise signal (representing an expected data stream) included within the output emanation of the output device 120, similar to the operation discussed above with respect to FIG. 2. In the illustrated embodiment of FIG. 4, a transmitter 402 may be included within the computing device environment 410. The transmitter 402 is responsible for transmitting a monitoring signal 405 to a remote attestation device 420. The monitoring signal 405 contains the attestation signal (i.e., the expected data stream used to generate the noise signal). In this way, the remote attestation device 420 is aware of the expected data stream responsible for the induced noise signal within the output signal of the output device 120.

In various embodiments, the transmitter 402 may be an antenna or component designed to intentionally transmit signals. In some embodiments, the transmitter 402 may be a passive component within the device that is operated by the controller 110 or the output artifacts 210a, 220a, or 230a to involuntarily transmit the monitoring signal 405. Whereas dedicated transmitters are designed to transmit signals, other components or elements within an embedded device can be operated to induce a transmission that can be received by a receiver. For example, a signal can be modulated onto general purpose input/output ("GPIO") pins on a circuit board within a device and, using the passive circuit components on the board, be transmitted. The transmission can occur over different mediums. For example, any non-shielded component on the board may be used as a radiating element to emit an RF signal including the monitoring signal 405. In other embodiments, the monitoring signal 405 may be converted into an audible signal by a capacitor or actuator on the board acting as a sound transducer. Further discussion of involuntary transmission may be found in U.S. Provisional Application No. 62/256,665, to which this application claims priority and is hereby incorporated in its entirety.

Using the remote attestation device 420, the integrity of the input device 130 may be tested. The signal received by the input device 130 may be transmitted 406 to the remote attestation device 420, where the comparison with the expected data stream received via the receiver 412 may be performed. In the illustrated embodiments, a transmitter 404 may be connected with the input device 130, and designed to transmit the received signal to a receiver 414 of the remote attestation device 420. In other embodiments, the input device 130 may include a transmitter for this purpose.

The remote attestation device 420 is designed to perform the extracting of the data received by the input 130 and determine whether there is a match between the extracted noise signal and the expected noise signal. In various embodiments, remote attestation device 420 may be a handheld or portable device. In other embodiments, remote attestation device 420 may be incorporated into another device or testing equipment. Utilizing remote attestation device 420, the attestation process is physically decoupled from the device under test, enabling validation to be performed anywhere, including while the device with which the sensor is associated is in operation. This allows validation of the sensory data input without requiring the sensor or device to be taken out of operation. Further, attestation of sensory input data for sensors operating around the world could be conducted at a central location with a remote attestation device 420 configured to receive the transmitted signals (i.e., monitoring signal 405 and input signal 406).

Remote attestation device 420 includes an input artifact 220b, similar to the input artifact 220b discussed above with respect to FIG. 2. In other words, the remote attestation device 420 includes the input artifact-portion of the environment 200 discussed above with respect to FIG. 2. Input artifact 220b is the only input artifact illustrated in FIG. 4 for ease of discussion. In other embodiments, input artifacts 210b or 230b may be implemented, or a combination of input artifacts 210b, 220b, 230b. Input artifact 220b may perform the extracting, decoding, and/or decryption of the raw data received by the input device 130 and transmitted to the remote attestation device 420.

Controller 422 may be a processor and associated software configured to control operation of receivers 412, 414 and other components of the remote attestation device 420. In some embodiments, controller 422 may compare the attestation signal and the received data stream filtered by input artifact 220b to determine if there is a match. In other embodiments, the input artifact 220b may perform the comparison. If the comparison results in no match between the filtered received data stream of the noise signal and the expected data stream, the input artifact 220b or the controller 422 may trigger a mismatch response, similar to the mismatch responses discussed above with respect to FIG. 2. In various embodiments, the remote attestation device 420 may include hardware and software for transmitting control messages to the computing device 410.

In various embodiments, the remote attestation device 420 may have prior knowledge of the attestation signal. In such embodiments, the transmitter 402 and receiver 412 may be omitted as the need to transmit the monitoring signal 405 is alleviated. The remote attestation device 420 would already be aware of the expected data stream. In various embodiments, the remote attestation device 420 may have knowledge of the expected data stream built into the controller 422, an output artifact 210a, 220a, 230a within the remote attestation device 420, or provided to the remote attestation device 420 from a trusted source.

Figure 5:
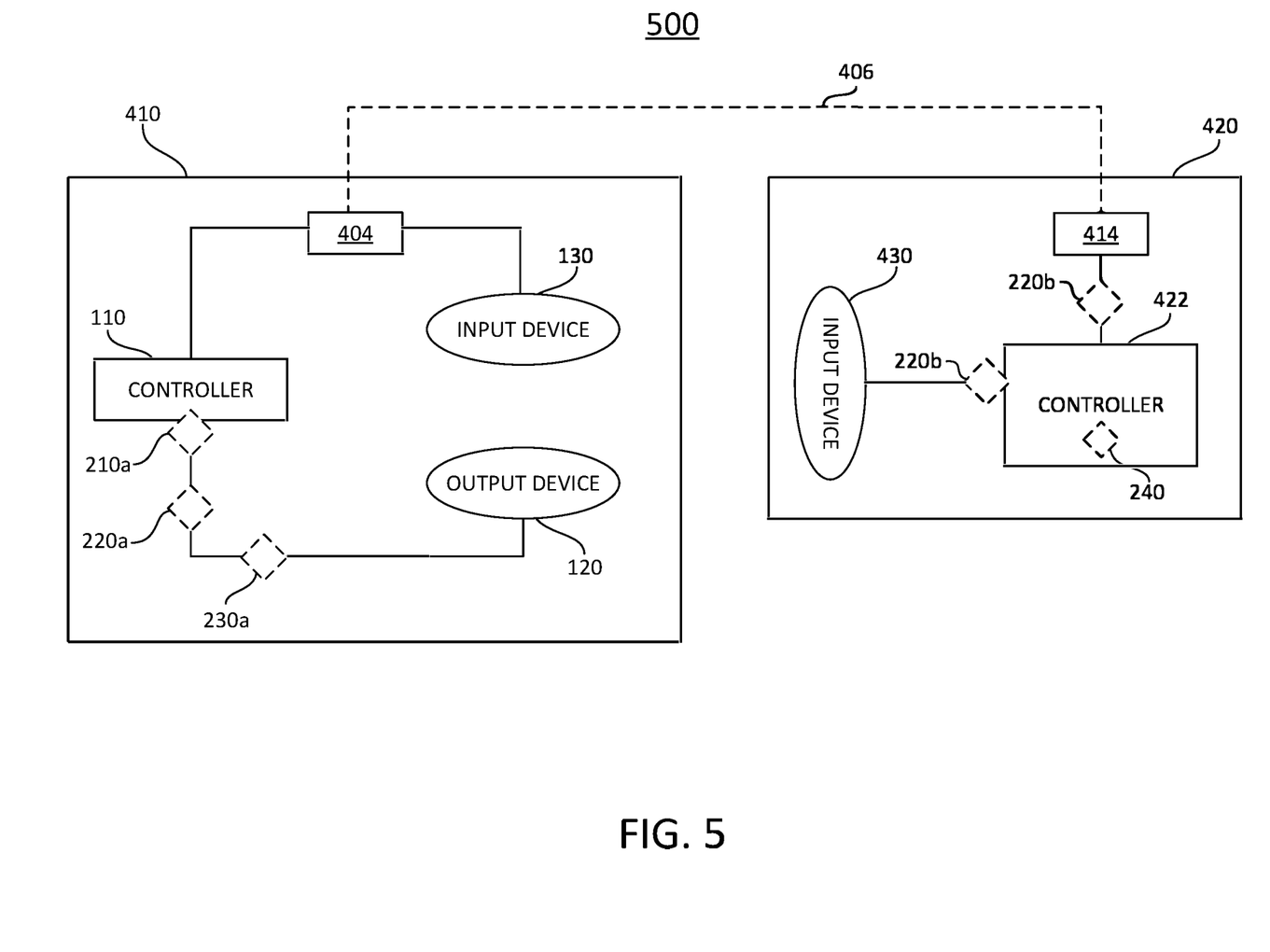
FIG. 5 illustrates another example remote attestation environment in accordance with various embodiments of the technology disclosed herein.

In various embodiments, the remote attestation device 420 may include its own input device 530, as illustrated in FIG. 5. In some embodiments, input device 530 may be the same type of sensor as input device 130. In other embodiments, input device 530 may be a similar type of sensor capable of capturing the emanated signal from the output device 120 in such a way that the received data may be filtered and decoded for use in comparison with the expected data stream.

FIG. 5 further illustrates the remote attestation device 420 having prior knowledge of the expected data stream. In the illustrated embodiment, controller 422 includes implant 240, which is aware of the expected data stream injected into the output signal of output device 120 by input artifacts 210a, 220a, or 230a in the device environment 410. Accordingly, a monitoring signal (like the monitoring signal 405 discussed with respect to FIG. 4) is not required to enable the remote attestation device 420 to check the validity of the sensory input data.

Although discussed with respect to an output device and an input device, various embodiments of the technology disclosed herein may utilize multiple output devices and input devices. A controller may be connected to and operate multiple output devices, multiple input devices, or a combination thereof. Moreover, output artifacts and input artifacts may be designed to interact with more than one output device and/or input device. In this way, multiple data points may be utilized. Where multiple output devices are implemented, each output device may have a different expected data stream injected into its respective output signal. In other embodiments, the same expected data stream may be injected into the output signals of each output device.

Figure 6:
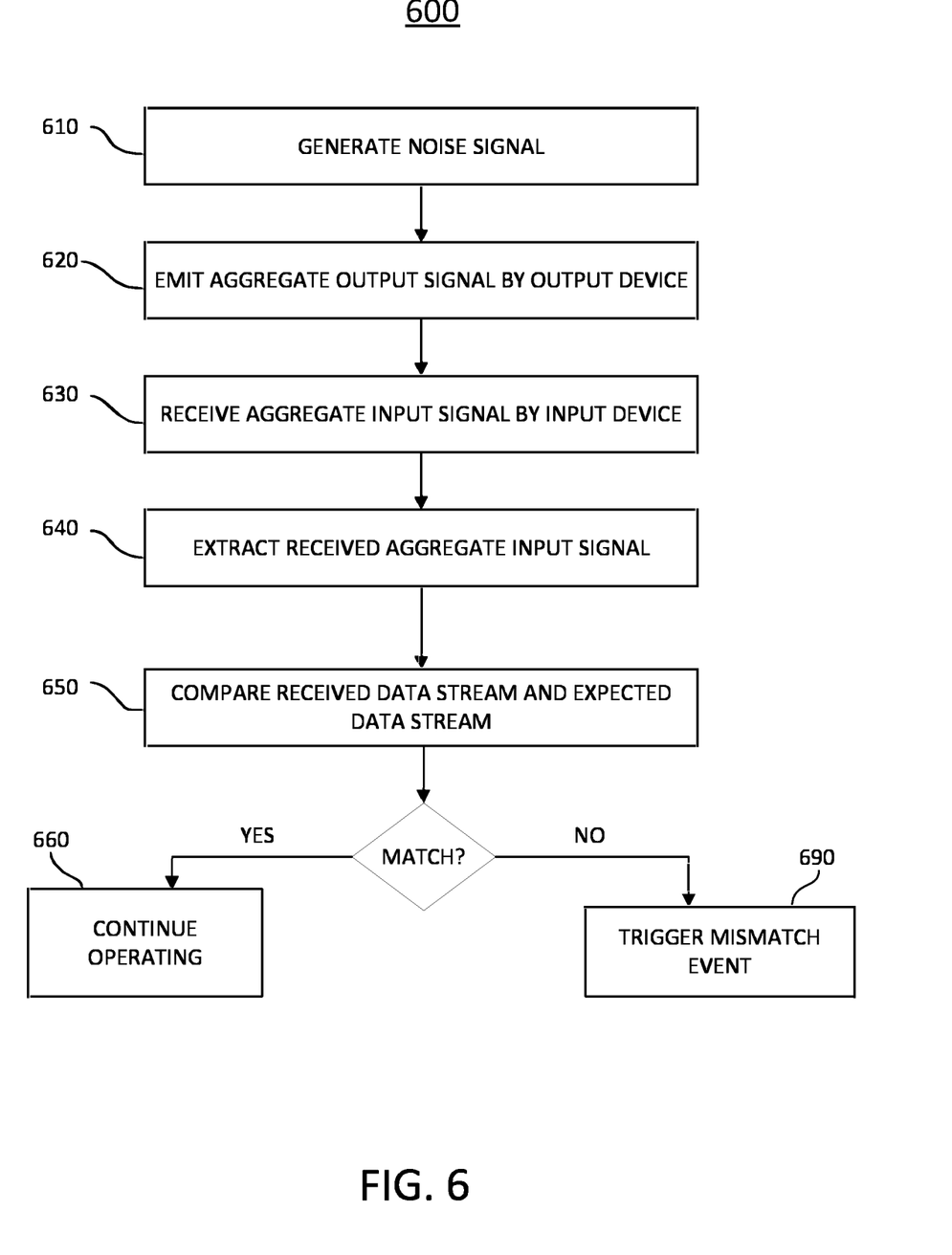
FIG. 6 illustrates an example method of sensory input attestation in accordance with embodiments of the technology disclosed herein.

FIG. 6 illustrates an example method of sensory input attestation 600 in accordance with embodiments of the technology disclosed herein. At 610, a noise signal is generated by the output artifact. The output artifact may be added to the device under test after production or be built into the device during manufacturing, as discussed above with respect to FIG. 2. The output artifact may be one or more of the output artifacts 210a, 220a, 230a, or implant 240, and the input artifact may be one or more of the input artifacts 210b, 220b, 230b, or implant 240, all discussed above with respect to FIG. 2. In various embodiments, the output artifact and the input artifact may be installed in the same device to enable local sensory input data attestation. In other embodiments, the input artifact may be part of a testing apparatus physically distinct from the device under test, similar to the remote attestation device 420 discussed with respect to FIGS. 4 and 5. In some embodiments, more than one output artifact and more than one input artifact may be within the device.

The noise signal is an encoded representation of an expected data stream. In various embodiments, a pre-determined modulation and encoding scheme is used to encode the expected data stream, and the output artifact and input artifact have knowledge of the pre-determined scheme. In some embodiments, cryptographic protection may further be used. In embodiments implementing a remote testing device, a monitoring signal containing the expected data stream (i.e., attestation signal) may be transmitted to the remote testing device at 610 by the device under test, or from a trusted source, prior to performing the attestation. In other embodiments, the remote attestation device may have knowledge of the expected data stream built into the remote attestation device.

At 620, the output device emits an aggregate output signal. The aggregate output signal is the aggregate of the original normal signal of the controller to the output device, and the noise signal (i.e., induced variation) introduced by the output artifact. In this way, the emanation of the output device contains a known noise pattern for use in active attestation of the input device. In various embodiments, more than one output device may emit an aggregate output signal containing the noise signal generated by the output artifact, or by more than one output artifact.

At 630, the input device receives an aggregate input signal. The aggregate input signal may include the aggregate output signal emanated from the output device. In embodiments implementing a remote testing device, the received aggregate input signal may be transmitted to the remote testing device for determination of validity, or captured independently by a second input device of the remote attestation device.

At 640, the input artifact extracts the received noise signal from the aggregate input signal. The aggregate input signal comprises the received noise signal and the normal output signal captured by the input device. As the input artifact has knowledge of the normal output signal of the output device (i.e., the control signal sent by the controller), the input artifact is capable of separating the received noise signal from the normal output signal. The received noise signal may be decoded by the input artifact in various embodiments. By decoding the received noise signal, the input artifact can identify a received data stream represented by the noise signal. The decoding may be done according to the pre-determined modulation and encoding scheme used to generate the noise signal. In various embodiments, decoding may include demodulating and/or decrypting the received noise signal, similar to the process discussed above with respect to FIGS. 2, 3A, and 3B. In embodiments implementing a remote testing device, the extraction may be performed by the remote attestation device.

At 650, the received data stream and the expected data stream are compared. If there is a match, the input data captured by the input device is validated and the computing device can continue operating 660. If there is no match, a mismatch response is triggered at 670. Non-limiting examples of mismatch responses include but are not limited to: generating and transmitting an alert to a second device; collecting forensic data; performing one or more additional system checks; shutdown of a computing device associated with the input device; or reboot the computing device associated with the input device. In embodiments implementing a remote testing device, the comparison may be performed by the remote attestation device.

The term tool can be used to refer to any apparatus configured to perform a recited function. For example, tools can include a collection of one or more components and can also be comprised of hardware, software or a combination thereof. Thus, for example, a tool can be a collection of one or more software components, hardware components, software/hardware components or any combination or permutation thereof. As another example, a tool can be a computing device or other appliance on which software runs or in which hardware is implemented.

As used herein, the term component might describe a given unit of functionality that can be performed in accordance with one or more embodiments of the technology disclosed herein. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent component names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of sensory input integrity attestation, comprising:
generating an attestation signal by an output artifact, the attestation signal comprising an expected data stream encoded according to an encoding scheme;
generating an aggregate output signal comprising the attestation signal;
emitting, by an output device of an embedded device, the aggregate output signal independent of an expected input signal type of an input device of the embedded device;
detecting an input signal by the input device;
extracting, by an input artifact of the input device, a received data stream from the input signal, the received data stream comprising data encoded according to the encoding scheme; and
comparing, by the input artifact, the received data stream and the expected data stream,
wherein the expected data stream is known by the output artifact and the input artifact.

2. The method of claim 1, wherein at least one of the output artifact and the input artifact is a software artifact, a hardware artifact, or a combination thereof.

3. The method of claim 1, wherein the output device comprises any element associated with a controller of the embedded device which the controller manipulates to emit an output signal.

4. The method of claim 1, wherein the input device comprises any element associated with a controller of the embedded device which the controller manipulates to receive an emanating signal.

5. The method of claim 1, wherein a controller of the embedded device is associated with one or more output devices and one or more input devices.

6. The method of claim 1, wherein extracting the received data stream comprises decrypting the received data stream according to an encryption scheme.

7. The method of claim 1, further comprising triggering by a controller of the embedded device a mismatch response, wherein a mismatch response occurs when the received data stream does not match the expected data stream.

8. The method of claim 7, wherein the mismatch response comprises at least one of: generating and transmitting an alert to a second device; collecting forensic data; performing one or more additional system checks; shutdown of the embedded device associated with the input device; and reboot the embedded device associated with the input device.

9. The method of claim 1, wherein the input device is a remote attestation device.

10. The method of claim 9, wherein the remote attestation device comprises an implant artifact aware of the expected data stream created by the output artifact.

11. The method of claim 9, further comprising transmitting a monitoring signal to the remote attestation device, the monitoring signal comprises the expected data stream.

12. A sensory input integrity attestation system, comprising:
an output artifact configured to generate an attestation signal, the attestation signal comprising an expected data stream encoded according to an encoding scheme; and
an embedded device comprising:
an output device configured to generate and emit an aggregate output signal comprising the attestation signal; and
an input device configured to detect an input signal, the input device comprising an input artifact configured to:
extract a received data stream from the input signal, the received data stream comprising data encoded according to the encoding scheme, and
compare the received data stream and the expected data stream,
wherein the output device emits the aggregate output signal independent of an expected input signal type of the input device and the expected data stream is known by the output artifact and the input artifact.

13. The sensory input integrity attestation system of claim 12, wherein at least one of the output artifact and the input artifact is a software artifact, a hardware artifact, or a combination thereof.

14. The sensory input integrity attestation system of claim 12, wherein the output device comprises any element associated with a controller of the embedded device which the controller manipulates to emit an output signal.

15. The sensory input integrity attestation system of claim 12, wherein the input device comprises any element associated with a controller of the embedded device which the controller manipulates to receive an emanating signal.

16. The sensory input integrity attestation system of claim 12, wherein a controller of the embedded device is associated with one or more output devices and one or more input devices.

17. The sensory input integrity attestation system of claim 12, wherein extracting the received data stream comprises decrypting the received data stream according to an encryption scheme.

18. The sensory input integrity attestation system of claim 12, wherein the embedded device further comprises a controller configured to trigger a mismatch response, wherein the mismatch response occurs when the received data stream does not match the expected data stream.

19. The sensory input integrity attestation system of claim 18, wherein the mismatch response comprising at least one of: generating and transmitting an alert to a second device; collecting forensic data; performing one or more additional system checks; shutdown of the embedded device associated with the input device; and reboot the embedded device associated with the input device.

20. The sensory input integrity attestation system of claim 12, wherein the input device is a remote attestation device.

21. The sensory input integrity attestation system of claim 20, wherein the remote attestation device comprises an implant artifact aware of the expected data stream created by the output artifact.

22. The sensory input integrity attestation system of claim 20, wherein the detected input signal to the remote attestation device is transmitted by at least one of a transmitter and a passive component.

23. The sensory input integrity attestation system of claim 20, wherein the remote attestation device is further configured to receive a monitoring signal comprising the expected data stream.

24. The method of claim 1, wherein the encoding scheme is known by the input artifact.

25. The method of claim 1, wherein extracting, by the input artifact of the input device, the received data stream comprises decoding the received data stream according to the encoding scheme.

* * * * *